United States Patent [19]
Kassai

[11] Patent Number: 5,518,297
[45] Date of Patent: May 21, 1996

[54] SEAT-TYPE BED FOR NURSING INSTRUMENT

[75] Inventor: Kenzou Kassai, Osaka, Japan

[73] Assignee: Aprica Kassai Kabushikikaisha, Osaka, Japan

[21] Appl. No.: 166,012

[22] Filed: Dec. 13, 1993

[30] Foreign Application Priority Data

Dec. 15, 1992 [JP] Japan .................................. 4-334484
Nov. 16, 1993 [JP] Japan .................................. 5-286735

[51] Int. Cl.⁶ .............................. A47D 1/00; A47C 27/15
[52] U.S. Cl. .............................. 297/452.55; 297/452.37
[58] Field of Search ..................... 297/452.17, 452.36, 297/452.37, 452.55; 5/464, 655

[56] References Cited

U.S. PATENT DOCUMENTS

| | | | |
|---|---|---|---|
| 2,669,294 | 2/1954 | Burdick et al. | 297/452.55 |
| 3,642,323 | 2/1972 | Taylor | 297/452.17 |
| 4,434,513 | 3/1984 | Welch. | |
| 4,773,702 | 9/1988 | Takahashi et al. | 5/655 X |
| 5,062,677 | 11/1991 | Jay et al. | 297/452.37 X |
| 5,269,590 | 12/1993 | Carilli | 297/452.55 |

FOREIGN PATENT DOCUMENTS

| | | |
|---|---|---|
| 0481452 | 4/1992 | European Pat. Off. . |
| 3405210 | 8/1985 | Germany . |
| 58-33149 | 7/1983 | Japan . |
| 58-33148 | 7/1983 | Japan . |
| 62-128844 | 11/1987 | Japan . |
| 131174 | 8/1990 | Taiwan . |
| 2183470 | 6/1987 | United Kingdom . |

*Primary Examiner*—Peter R. Brown
*Attorney, Agent, or Firm*—W. G. Fasse; W. F. Fasse

[57] ABSTRACT

A baby's or child's head is protected against a severe shock in a seat-type bed which is provided for example as part of a baby carriage. For this purpose a first cushion member is arranged to cover a seat, a backrest, a pair of side walls and a top wall, while a second cushion member is additionally arranged on a back side of the first cushion member only on parts of the backrest, the side and walls which are likely to be contacted by the baby' or child's head.

12 Claims, 4 Drawing Sheets

SEAT-TYPE BED FOR NURSING INSTRUMENT

FIELD OF THE INVENTION

The present invention relates to a nursing instrument such as a baby carriage comprising a seat-type bed, or a nursing instrument such as a baby or child safety seat for an automobile comprising a reclining chair type seat with a hinged backrest which can also serve as a cot. More particularly, the nursing instrument is equipped with a seat-type bed.

BACKGROUND INFORMATION

An important objective to be achieved by a nursing instrument comprising a seat-type bed, is the safety for a baby or child. In order to improve such safety, the nursing instrument is generally provided with a seat-type bed which comprises not only a seat and a backrest for supporting the lower and upper parts of the baby's or child's body but also a pair of side walls extending upwardly at least from both side edges of the backrest and a top wall extending upwardly from an upper edge of the backrest for coupling upper edges of the pair of side walls with each other. The seat, the backrest, the side walls and the top wall are covered with cushions respectively, to provide comfort for the baby.

The side walls are adapted to prevent the baby or child from slipping sideways or coming down from the seat-type bed, as well as to protect the baby or child against a side shock. On the other hand, the top wall is adapted to prevent the baby or child from slipping upwardly or falling out of the seat-type bed, as well as to protect it against a shock which may be applied to the baby's or child's head from above.

Such a nursing instrument is employed for a baby or child who is in a stage of remarkable cerebral development. Thus, it is necessary to protect the brain of such a baby or child to greater care as compared with an adult.

The backrest, the side walls and the top wall which are positioned around the baby's or child's head also effectively contribute to protection of its brain. In order to attain higher safety, however, the nursing instrument must be provided with safety features capable of countering various adverse, situations. For example, a baby carriage may run against some obstacle or overturn during movement. On the other hand, a baby or child chair, a cradle or a swing may collide with another child who runs about in the vicinity of such a nursing instrument. In a baby or child safety seat which is set in an automobile, it is further necessary to take into consideration a possible accident.

While the aforementioned cushion members allow for the comfort of the baby or child, the portions covered with such cushion members may be so softened that the same cannot effectively cope with a severe shock.

SUMMARY OF THE INVENTION

Accordingly it is an object of the present invention to provide a seat-type bed for a nursing instrument, which can protect a baby's or child's head against a severe shock.

The present invention is directed to a seat-type bed for a nursing instrument which comprises a seat for supporting the lower part of a baby's or child's body, a backrest for supporting the upper part of the baby's or child's body, a pair of side walls extending upwardly from at least both side edges of the backrest, and a top wall extending upwardly from an upper edge of the backrest for coupling upper edges of the pair of side walls with each other. The seat, the backrest, the side walls and the top wall are covered with a first cushion member. In order to solve the aforementioned technical problem, the present invention has the following structure:

A second cushion member having a larger elastic coefficient than the aforementioned first cushion member, is arranged on a back side of the first cushion member only on parts of the backrest, the side walls, and on the top wall which parts may be contacted by the baby's or child's head.

The aforementioned second cushion member is preferably arranged to be in contact with the first cushion section. However, a third cushion member may be interposed between the first and second cushion members. In the latter case, the third cushion member preferably has an elastic coefficient which is larger than that of the first cushion member and smaller than that of the second cushion member.

According to the present invention, substantially only the first cushion member is deformed during ordinary use to provide comfort for the baby.

When a severe shock is applied to the nursing instrument, on the other hand, the second cushion member is also deformed to effectively absorb the shock.

In the embodiment having the third cushion member arranged between the first and second cushion members. The third cushion member functions to compensate for the shock absorbing function provided by the second cushion member. In other words, the third cushion member may be deformed substantially with no deformation of the second cushion member, or both of the second and third cushion members may be deformed, depending on the level of the shock.

According to the present invention, the second cushion member which can absorb a severe shock is arranged on parts which may be contacted by the baby's or child's head, whereby it is possible to sufficiently protect the head against a severe shock. More specifically the second cushion member is arranged on parts of the backrest portion and the side walls which may be contacted by the baby's or child's head and on the top wall, whereby the baby's or child's head is surrounded by sections of the seat-type bed provided with the second cushion member. Even if the baby's or child's head should be shifted by a shock or of its own will, the action of the second cushion member will be effective in any position of the head. Therefore, it is possible to further improve the safety of the nursing instrument comprising such a seat-type bed.

Further, the sections provided with the second cushion member are restricted to parts of the backrest and the side walls, and the top wall. Thus, it is possible to minimize any increase in size of the seat-type bed which may result from the second cushion member in addition to the first cushion member.

When the third cushion member is arranged between the first and second cushion members, it is possible to further improve the reliability of the shock absorbing function.

DESCRIPTION OF THE PREFERRED EMBODIMENTS

Figure 1:
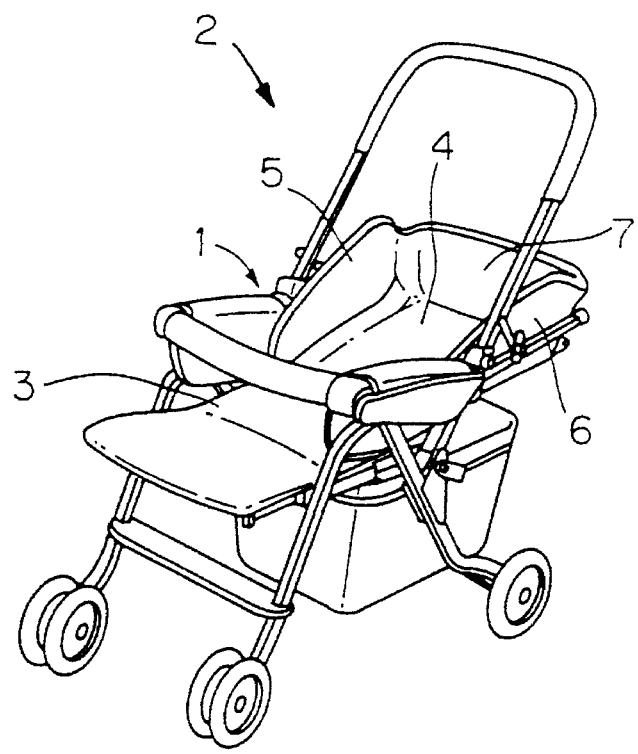
FIG. 1 is a perspective view showing a baby carriage as an exemplary nursing instrument to which an embodiment of the present invention is applied.

FIG. 1 is a perspective view showing a baby carriage 2 as an exemplary nursing instrument comprising a seat-type bed 1 according to an embodiment of the present invention.

The seat-type bed 1 comprises a seat 3 for supporting the lower part of a baby's or child's body, and a backrest 4 for supporting the upper part of the baby's or child's body. A pair of side walls 5 and 6 extend upwardly from both side edges of the backrest 4. Further, a top wall 7 extend upwardly from an upper edge of the backrest 4. This top wall 7 couples upper edges of the pair of side walls 5 and 6 with each other.

Figure 2:
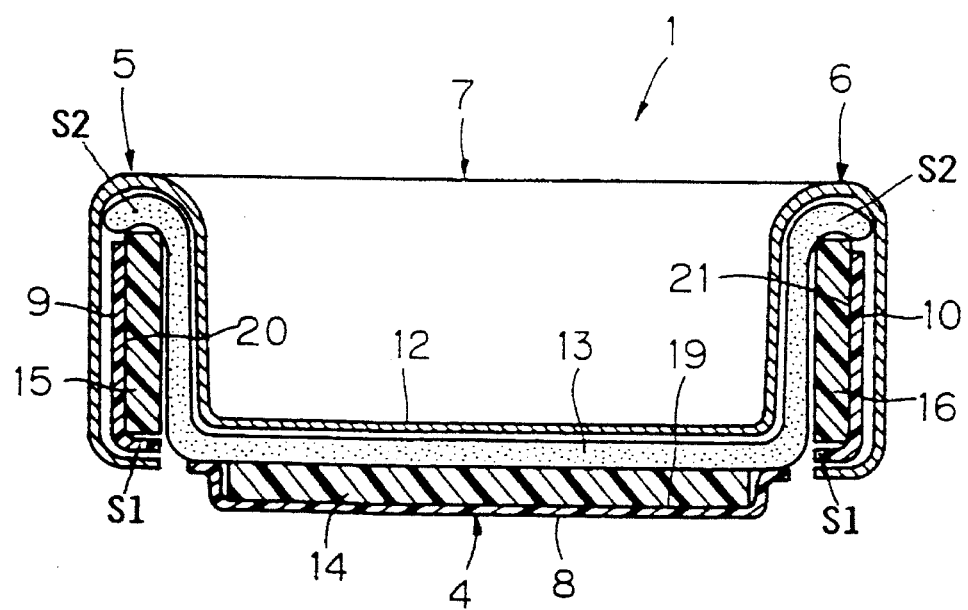
FIG. 2 is a cross sectional view through a backrest and side walls of a seat-type bed shown in FIG. 1.
Figure 3:
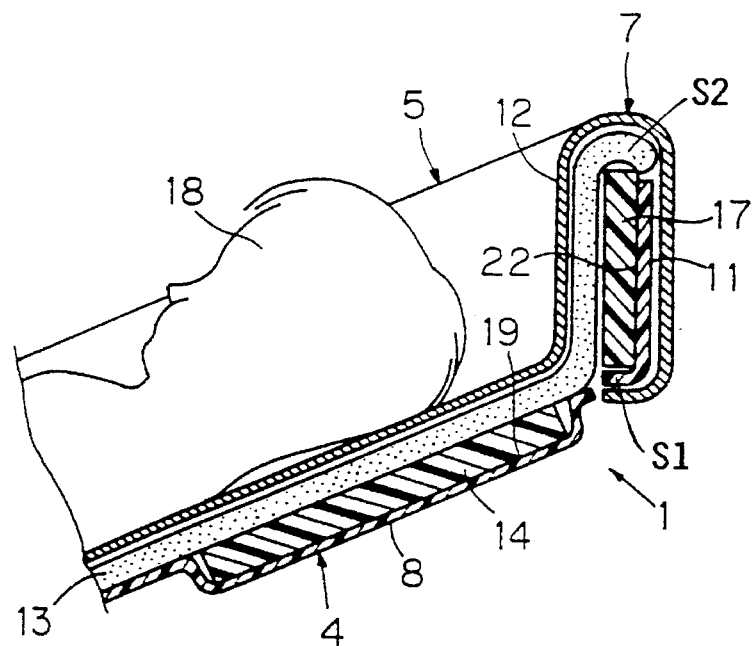
FIG. 3 is a longitudinal sectional view through the backrest and a top wall of the seat-type bed shown in FIG. 1.

As shown in FIGS. 2 and 3, the backrest 4, the side walls 5 and 6 and the top wall 7 comprise supporting wall section 8, 9, 10 and 11 of a rigid material such as hard plastic for keeping these portions in shape namely dimensionally stable. A facing 12 of cloth, for example, forms a case or covering for the front surfaces of the backrest 4, the side walls 5 and 6 and the top wall 7. A continuous or one piece first cushion member 13 is arranged on the back side of the facing 12. The continuous first cushion member 13 is made of a soft material having a relatively small elastic coefficient such as urethane foam or fiber aggregate, for example. The continuous first cushion member 13 may alternatively be lined with the facing 12. The seat 3 also comprises a supporting wall section, a first cushion member and a facing (not shown).

The aforementioned structure is substantially similar to that in a conventional seat-type bed. This embodiment has the following additional structure:

Namely, separate second cushion members 14, 15, 16 and 17 are arranged on the back side of the first cushion member 13. These second cushion members 14, 15, 16 and 17 are positioned only on a part of the backrest 4, the side walls 5 and 6, and the top wall 7 which may be contacted by the baby's or child's head 18 (FIGS. 2 and 3 The separate second cushion members 14 to 17 are made of a material having a larger elastic coefficient than the first cushion member 13, such as a polyethylene beads foaming material, polystyrene foam or a urethane section, for example.

The separate second cushion members 14 to 17 are preferably made larger in thickness than the first cushion member 13, to provide an improved shock absorption. Further, the second cushion member 14 which is positioned on the backrest 4 is preferably stored in a recess or cavity 19 which is formed in the support wall 8, to cause no steps on the first cushion member 13 and a portion of the facing 12 located thereon. The support walls 9, 10 and 11 are also provided with recesses 20, 21 and 22 having similar functions.

Figure 4:
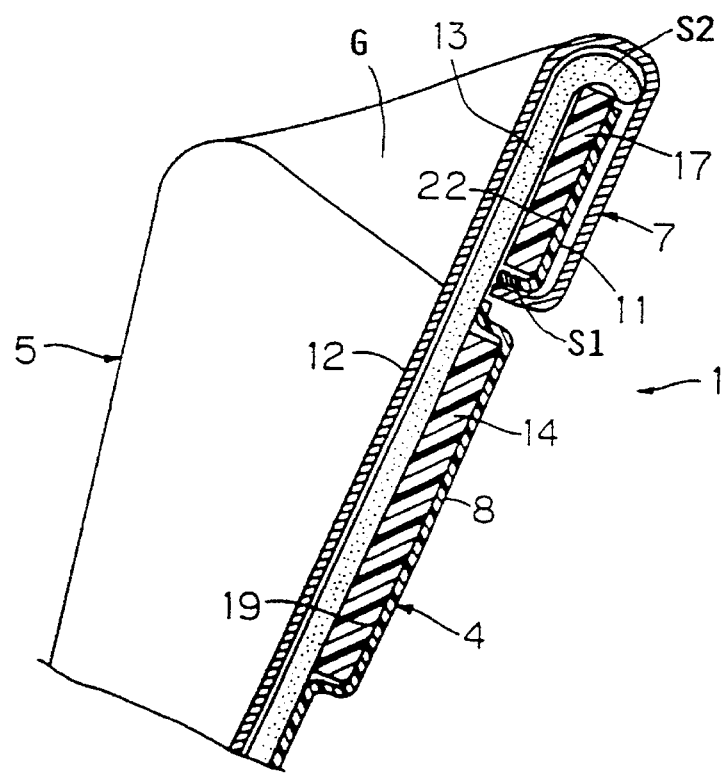
FIG. 4 is a longitudinal sectional view corresponding to FIG. 3, illustrating the backrest 4 in a raised state.

FIG. 4 is a longitudinal sectional view corresponding to FIG. 3, but showing the backrest 4 raised as compared with the state shown in FIG. 3. When the backrest 4 is inclined as shown in FIG. 3 to provide a form of a bed, the top wall 7 extends uprighted from the backrest 4. When the backrest 4 is raised as shown in FIG. 4, on the other hand, the top wall 7 extends to be flush with the backrest 4. Such a structure is currently employed in most baby carriages, and a structure for automatically adjusting the condition of the top wall 7 in response to the angle of inclination of the backrest 4 is described in Japanese Patent Publication No. 58-33148 or 58-33149 (1983), for example.

When the backrest 4 is raised as shown in FIG. 4, the separate second cushion member 14 or 17 provided on the backrest 4 or the top wall 7 and the separate second cushion members 15 and 16 (not shown in FIG. 4) provided on the side walls 5 and 6 also protect the baby's or child's head 18. FIG. 4 further shows a gusset G that couples the side wall 5 to the top wall 7 and permits the top wall 7 to assume the positions shown in FIGS. 3 and 4.

Figure 5:
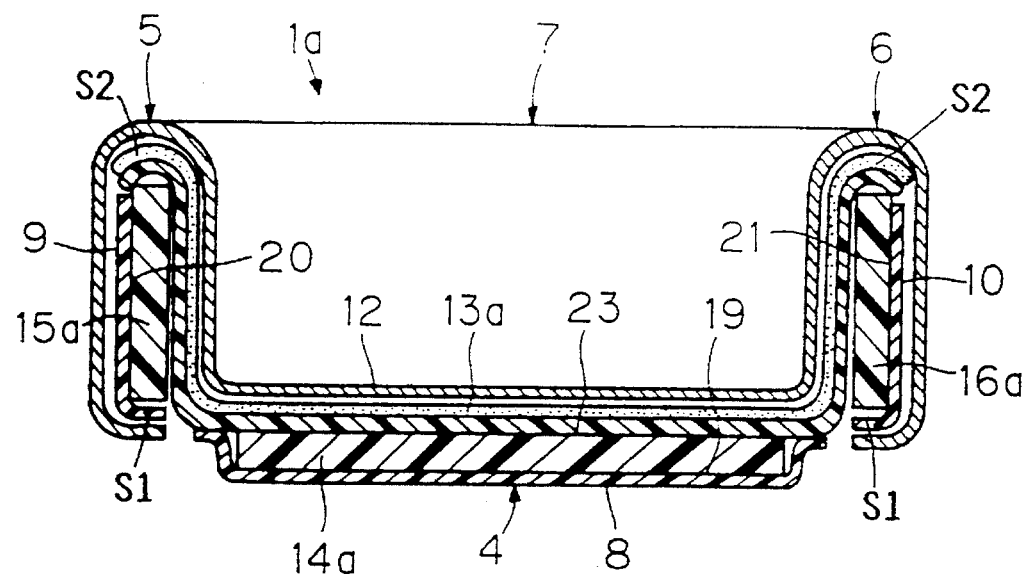
FIG. 5 is a cross sectional view corresponding to FIG. 2, showing a seat-type bed according to another embodiment of the present invention.
Figure 6:
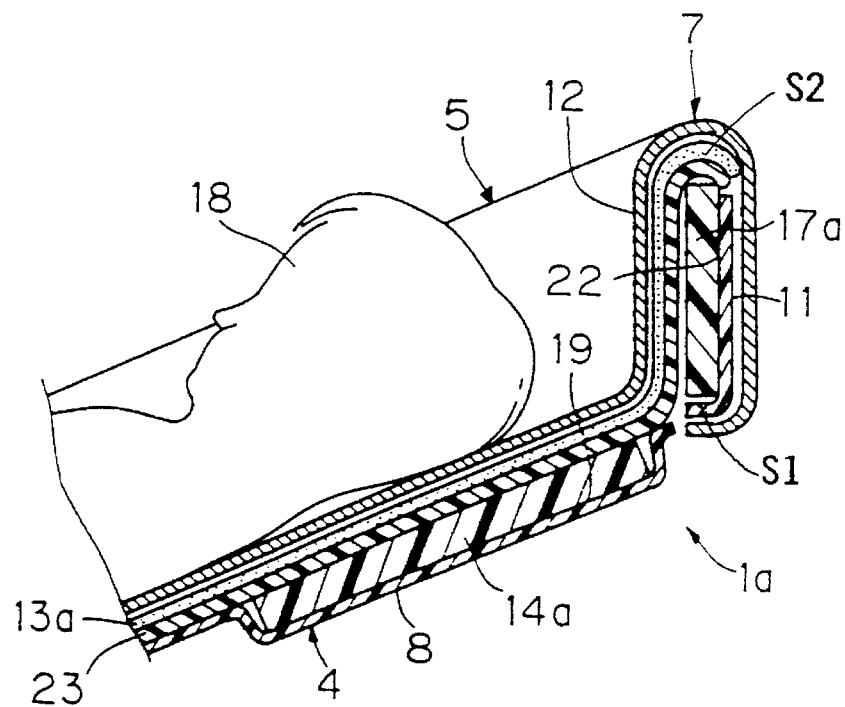
FIG. 6 is a longitudinal sectional view corresponding to FIG. 3, of the embodiment shown in FIG. 5.

FIGS. 5 and 6 are a cross sectional view and a longitudinal sectional view corresponding to FIGS. 2 and 3, respectively, showing a seat-type bed 1a according to another embodiment of the present invention. Referring to FIGS. 5 and 6, elements corresponding to those shown in FIGS. 2 and 3 are denoted by similar reference numerals.

According to this embodiment, a third cushion member 23 is arranged between a first cushion member 13a and second cushion members 14a, 15a, 16a and 17a. This third cushion member 23 is so arranged as to cover the overall back surface of the first cushion member 13a. The third cushion member 23 is made of a material having an elastic coefficient which is larger than that of the first cushion member 13a and smaller than that of the second cushion members 14a, 15a, 16a and 17a. Materials for the first cushion member 13a, the second cushion members 14a, 15a, 16a and 17a and the third cushion member 23 may be prepared as a combination of urethane foam, a polyethylene beads foaming material and a urethane section, a combination of fiber aggregate, polystyrene foam and urethane foam, or a combination of fiber aggregate, a urethane section and urethane foam, for example.

Figure 7:
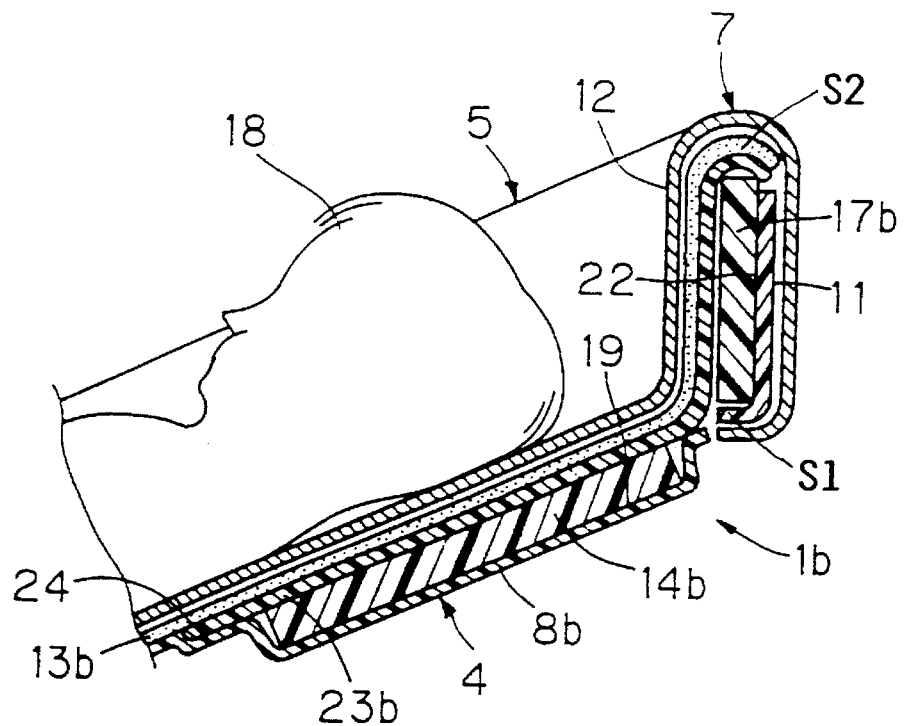
FIG. 7 is a longitudinal sectional view corresponding to FIG. 3, showing a seat-type bed according to still another embodiment of the present invention.

FIG. 7 is a longitudinal sectional view corresponding to FIG. 3, showing a seat-type bed 1b according to still another embodiment of the present invention. Referring to FIG. 7, elements corresponding to those shown in FIG. 3 are denoted by similar reference numerals.

In the embodiment shown in FIG. 7, a third cushion member 23b is arranged between a first cushion member 13b and second cushion members 14b and 17b. Schematically, the third cushion member 23b is arranged to be positioned only in regions provided with the second cushion members 14b and 17b. More specifically, the third cushion member 23b is so sized as to somewhat jut out beyond a lower edge of the second cushion member 14b, and a step 24 is provided on a support wall 8b for taking-up the thickness of the third cushion member 23b.

This embodiment is adapted to arrange the third cushion member 23b only in regions for receiving a baby's or child's head 18. Such a third cushion member 23b may be arranged to extend toward parts of the side walls 5 and 6 which may be contacted by the baby's or child's head 18, similarly to the third cushion member 23 shown in FIG. 5, although such arrangement is not shown in FIG. 7.

Figure 8:
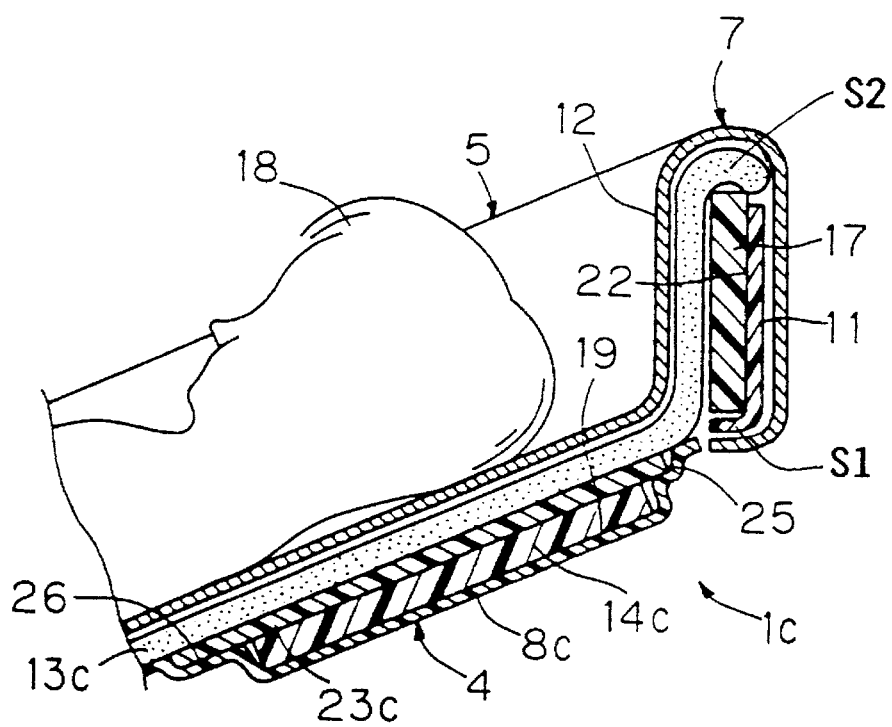
FIG. 8 is a longitudinal sectional view corresponding to FIG. 3, showing a seat-type bed according to a further embodiment of the present invention.

FIG. 8 is a longitudinal sectional view corresponding to FIG. 3, showing a seat-type bed according to a further embodiment of the present invention. Referring to FIG. 8, elements corresponding to those shown in FIG. 3 are denoted by similar reference numerals.

According to this embodiment, a third cushion member 23c is arranged between a first cushion member 13c and a second cushion member 14c. Schematically, the third cushion member 23c is positioned only in a region provided with the second cushion member 14c. More specifically, the third cushion member 23c is so sized as to somewhat jut out beyond upper and side edges of the second cushion member 14c respectively, and steps 25 and 26 are provided in a support wall 8c for taking-up such thicknesses of the third cushion member 23c.

According to this embodiment, the third cushion member 23c is arranged only in regions which may be contacted by a baby's or a child's head 18.

While the respective thicknesses of the first, second and third cushion members are shown in FIGS. 2 to 8, these thicknesses can be changed as required.

While the above description has been made with respect to an embodiment comprising first and second cushion members and those comprising first, second and third cushion members, the cushion members may be provided in a larger number of layers.

The operations of the backrest portion 4 and the top wall 7 shown in FIGS. 3 and 4 are not relevant for the present invention. In other words, the present invention is also applicable to a nursing instrument comprising the backrest portion 4 and the top wall 7 which are fixed in the mode shown in FIG. 3.

As shown in FIGS. 2 to 8, the rigid supporting wall sections 9, 10, and 11 have each a lower inwardly bent shoulder S1 to form the above mentioned recesses 20, 21, 22. The first cushion member 13 has upper outwardly bent shoulders S2 that cover the respective recess. The shoulders S1 reach under the respective second cushion member 15, 16, and 17. The shoulders S2 reach around an upper edge of the respective second cushion members 15, 16, and 17, whereby these second cushion members are held in place and the side walls 5, 6, and the top wall 7 remain dimensionally stable by the rigidity of the wall sections 9, 10, and 11.

Further, the present invention is not restricted to the aforementioned baby carriage, but is also applicable to another nursing instrument such as a baby or child chair, a cradle, a swing, or a baby or child safety seat for an automobile.

What is claimed is:

1. A seat-type bed for a nursing instrument, comprising: a seat for supporting a lower part of a baby's or child's body; a backrest for supporting an upper part of said baby's or child's body; a pair of side walls extending upwardly from at least both side edges of said backrest; a top wall extending upwardly from an upper edge of said backrest and gussets (G) coupling upper edges of said pair of side walls with said top wall; a continuous first cushion member covering said seat, said backrest, said side walls, and said top wall; said continuous first cushion member having outwardly bent shoulders (S2); rigid supporting wall sections (8, 9, 10, 11) including a rigid backrest wall section (8) forming a cavity (19), two rigid side wall sections (9, 10) each having a lower inwardly bent shoulder (S1), and a rigid top wall section (11) also having a lower inwardly bent shoulder (S1), separate second cushion members (14, 15, 16, 17) arranged on a back side of said continuous first cushion member and having a larger elastic coefficient than said first cushion member, said separate second cushion members including a backrest second cushion member (14) in said cavity (19), two side wall second cushion members (15, 16) one between said first cushion member (13) and each of said two rigid side wall sections (9, 10) so that said side wall second cushion members (15, 16) are held between said shoulders (S1, S2), and a top wall second cushion member (17) between said first cushion member (13) and said rigid top wall section (11) so that said top wall second cushion member (17) is held between respective shoulders of said shoulders (S1, S2), said rigid supporting wall sections (8, 9, 10, 11) keeping said backrest (4), said side walls (5, 6), and said top wall (7) dimensionally stable.

2. The seat-type bed for a nursing instrument in accordance with claim 1, wherein said continuous first cushion member contains urethane foam or fiber aggregate, and said second cushion members contain a urethane section, a polyethylene beads foaming material or polystyrene foam.

3. The seat-type bed for a nursing instrument in accordance with claim 1, wherein said second cushion members have a larger thickness than said first cushion member.

4. The seat-type bed for a nursing instrument in accordance with claim 1, further comprising a third cushion member interposed between said first cushion member and said second cushion members, said third cushion member having an elastic coefficient larger than that of said first cushion member and smaller than that of said second cushion members.

5. The seat-type bed for a nursing instrument in accordance with claim 4, wherein said third cushion member is arranged to extend along the overall back surface of said first cushion member between said first cushion member and said second cushion members.

6. The seat-type bed for a nursing instrument in accordance with claim 4, wherein said third cushion member is arranged only in parts of said backrest, in said side walls, and in said top wall.

7. The seat-type bed for a nursing instrument in accordance with claim 4, wherein said third cushion member is arranged only in a part of said backrest.

8. The seat-type bed for a nursing instrument in accordance with claim 4, wherein said first, second and third cushion members contain urethan foam, a polyethylene beads foaming material, and a urethane section respectively.

9. The seat-type bed for a nursing instrument in accordance with claim 4, wherein said first, second and third cushion members contain fiber aggregate, polystyrene foam, and urethane foam respectively.

10. The seat-type bed for a nursing instrument in accordance with claim 4, wherein said first, second and third cushion members contain fiber aggregate, a urethane section, and urethane foam respectively.

11. The seat-type bed for a nursing instrument in accordance with claim 1, wherein said nursing instrument is a baby carriage.

12. The seat-type bed for a nursing instrument in accordance with claim 1, further comprising a facing (12) forming a case or covering for the front surface of said backrest (4), for both sides of said side walls (5, 6), and for both sides of said top wall (7).

* * * * *